Nov. 7, 1961     D. H. MOELLER ET AL     3,007,834
HONEYCOMB FABRICATION
Filed June 17, 1960
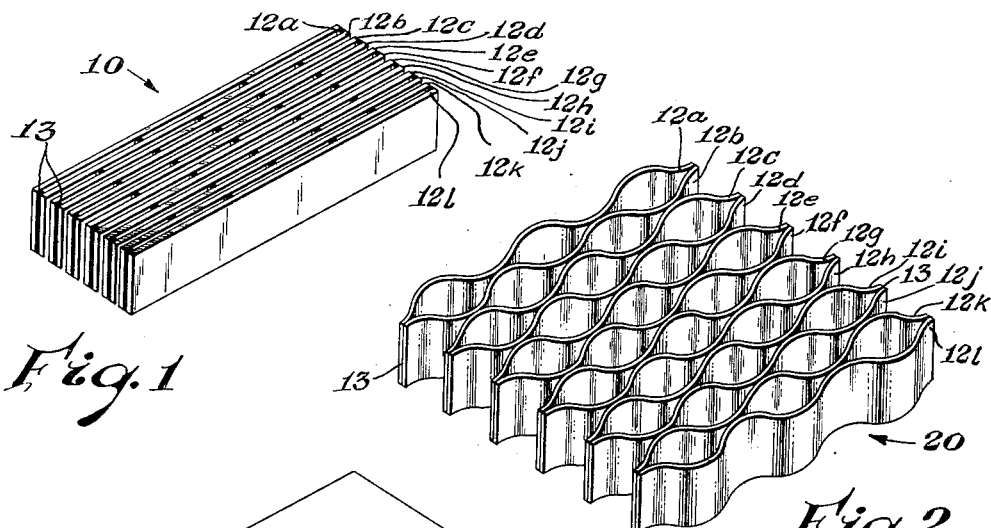
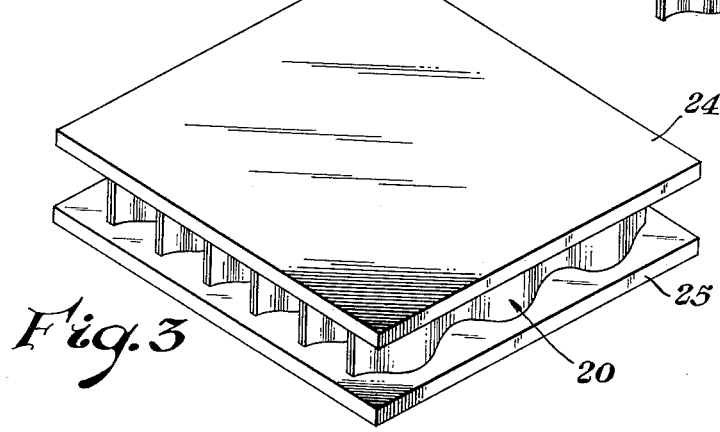
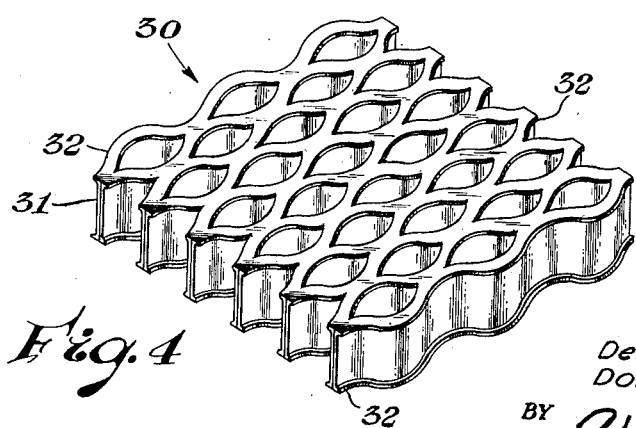
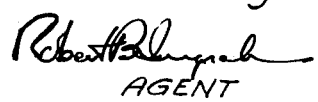
INVENTORS.
Delmer H. Moeller
Donald R. Gray
BY
AGENT

3,007,834
HONEYCOMB FABRICATION
Delmer H. Moeller and Donald R. Gray, Midland, Mich., assignors to The Dow Chemical Company, Midland, Mich., a corporation of Delaware
Filed June 17, 1960, Ser. No. 36,867
5 Claims. (Cl. 156—197)

This invention relates to a method of rigidizing products of structural cellular material and more particularly relates to a method of rigidizing expanded thermoplastic resinous honeycomb core material.

It is contemplated that the present invention will have particular utility in the art of rigidizing a type of cellular material generally known in the trade as honeycomb core. Also, it is known that the scope of the invention is not limited to any particular type of expandable cellular material prepared from thermoplastic resinous sheet.

For the purposes of brevity and simplicity, the present invention will be described with particular relation to honeycomb core. Various honeycomb cores have been fabricated from thermoplastic resinous material. At least two common methods were generally employed in the art. One is the direct molding of the resinous material into the final desired form. This technique is relatively costly and suffers from the severe disadvantage that the resultant product has an extremely low bulk density and is relatively expensive to ship.

Honeycomb may be prepared by molding or forming a number of corrugated webs and gluing or otherwise joining the corrugated webs together in a face-to-face arrangement wherein the corrugations of adjacent sheets are longitudinally displaced from each other by about one half the wave length of a corrugation. Honeycomb produced in this manner suffers from two major drawbacks. One is the extremely low shipping density and the other is that the honeycomb is not rigid when relatively small forces are applied in edgewise direction. By "edgewise" is meant in a direction generally normal to the faces of the corrugated webs employed in construction of a sheet.

It would be advantageous if there was available a method of rigidizing honeycomb structures which would result in a product that was relatively rigid to stress applied in all three dimensions.

It would be further advantageous if honeycomb material could be partially fabricated, shipped, expanded, and rigidized at the site of utilization.

It would be further advantageous if a rigid honeycomb material could be prepared, wherein the web edges were flanged.

These benefits and advantages may be obtained by a method of forming a rigidized honeycomb structure comprising joining a plurality of flat webs of thermoplastic resinous material having alternately spaced means of attachment between the adjacent webs; expanding said honeycomb; while in expanded position flanging or upsetting the edges of said webs while the edges of said webs are at a temperature sufficiently high to permit plastic flow and subsequently cooling said webs below said plastic flow temperature.

These benefits and other advantages will become apparent upon examination of the following specification and description when taken in view of the drawing, wherein:

FIGURE 1 represents a face view of a plurality of alternately affixed webs forming honeycomb cores;

FIGURE 2 depicts an isometric view of the honeycomb core of FIGURE 1 after expansion;

FIGURE 3 is a schematic representation of the flanging of the webs of the honeycomb core of FIGURE 2 between a pair of hot platens;

FIGURE 4 illustrates a completed rigidized flanged honeycomb core; and

FIGURE 5 illustrates a cross-sectional view of one of the webs of FIGURE 4.

In the drawing FIGURE 1 represents a honeycomb core designated generally by the reference numeral 10. The core 10 comprises a plurality of thermoplastic resinous webs 12a, 12b, 12c, 12d, 12e, 12f, 12g, 12h, 12i, 12j, 12k, and 12l. The adjacent webs are joined by the alternately arranged bonds 13.

In FIGURE 2 there is illustrated an isometric view of an expanded honeycomb structure 10 generally designated by the reference 20 wherein the webs 12a, 12b, 12c, 12d, 12e, 12f, 12g, 12h, 12i, 12j, 12k, and 12l have been pulled apart in the areas not held by the bonding means 13. This results in formation of a plurality of cellular spaces 22.

In FIGURE 3 there is schematically illustrated the expanded honeycomb 20 pressed between a pair of heated platens 24 and 25.

In FIGURE 4 there is shown a view of flanged honeycomb 30, wherein the webs 31 have been provided with a plurality of flanges 32.

In FIGURE 5 there is illustrated a cross-sectional view of a web 31 having formed thereon flanges 32.

A wide variety of thermoplastic resinous materials may be employed in the practice of the invention. It is generally advantageous to form such material into sheets by calendering, extrusion or pressing and subsequently slitting or shearing the sheets into relatively narrow webs 12 which will be employed in forming the honeycomb stack 10. Typical thermoplastic resinous materials which may be employed in the practice of the invention are polystyrene, polyvinyl chloride, polyethylene, polypropylene, tetrafluoroethylene, and all other sheet-formable thermoplastic polymeric or copolymeric materials. Advantageously, conventional fillers, pigments, and stabilizers may be incorporated into the sheet stock. The bonding means employed between the sheets in general will vary with the particular thermoplastic being used and, beneficially, such methods as gluing, thermalsealing, and dielectric heating may be employed to joint the web members together as well as the more conventional fastening means, such as clips, staples, screws, bolts, and the like.

Prior to the flanging operation the honeycomb stack 10 may be transformed to its expanded form 20 by a variety of methods including that set forth in U.S. Letters Patent No. 2,674,295 or by providing a number of rigidly fixed pegs or other bar-like members which may be inserted into spaces 22 at opposite edges of the honeycomb 20. If the degree of expansion wished is not excessive, and the number of spaces 22 along one edge is below about 10, the rigid peg technique is adequate. After the honeycomb 20 has been formed, a variety of methods may be employed to form the flanged or upset honeycomb section 30. Usually for most rapid and convenient production the honeycomb 30 is formed between a pair of heated platens. The temperature of the platens must be sufficient to cause the thermoplastic resinous material in the honeycomb 30 to flow and become permanently deformed. The platens are brought into contact with the edges of the webs 12 and forced closer together until the desired flange width has been formed. The platens are removed and the flanged honeycomb material 30 is cooled to a temperature below its softening point. Alternately, a single heated platen is employed if only one side of the sheet is to be upset. The sheet 30 may also be formed from the sheet 20 by applying platens smaller in total area than the area of the sheet by making a sufficient number of applications of hot platen until the entire sheet has been flanged.

It is usually advantageous to employ as a surface on the platens a material which does not adhere to the thermoplastic honeycomb at forming temperatures. Conventional mold release agents may be employed, such as waxes, siloxane derivatives, and similar antiadhesion preparations well known in the art. Alternately, the platens may be covered with sheets of nonadhesive material having a higher plastic flow temperature than the honeycomb material, such as polytetrafluoroethylene, polytetrafluoroethylene coated glass cloth and the like.

The flanged sheet 30 is particularly advantageous when employed in core construction wherein a solid bond is required between the honeycomb core and facer sheets wherein a relatively large gluing area is provided between the core and the face sheets with a minimum weight of honeycomb stack required.

A great benefit and advantage is achieved by use of the invention wherein shipping of the product is required. Fabrication of the honeycomb stack 10 requires relatively large, expensive, and bulky equipment, whereas the equipment required for the flanging operation is relatively small and simple. Subsequently, the honeycomb stack 10 may be prepared in large quantities and shipped in unexpanded form to the point where it is to be used and formed into the rigidized expanded honeycomb material 30 by employing a relatively simple, inexpensive, lightweight, hot platen press or similar portable flanging means including an electric iron.

As is apparent, the method is susceptible of being embodied with various alterations and modifications from that which is being described in the preceding description and specification. For this reason, it is to be understood that all of the foregoing is merely intended to be illustrative and is not to be construed or interpreted as being restrictive or otherwise limitative of the present invention except as set forth in the appended claims.

What is claimed is:

1. A method of forming a honeycomb structure comprising joining a plurality of flat webs of thermoplastic resinous material having alternately spaced means of attachment between the adjacent webs; expanding said honeycomb; and while in expanded position flanging the edges of said webs while the edges of said webs are at a temperature sufficiently high to permit plastic flow and subsequently cooling said webs below said plastic flow temperature.

2. The method of claim 1, wherein said thermoplastic resinous material is polystyrene.

3. The method of claim 1, wherein said expanded honeycomb structures are flanged from both edges of said webs.

4. The method of claim 1, wherein said flanges are formed by pressing between a pair of hot platens.

5. The method of claim 1, wherein said webs are glued together.

References Cited in the file of this patent

UNITED STATES PATENTS

| | | |
|---|---|---|
| 2,608,502 | Merriman | Aug. 26, 1952 |
| 2,719,809 | Herts | Oct. 4, 1955 |
| 2,809,403 | Clements | Oct. 15, 1957 |

OTHER REFERENCES

"Plastics" (May), November 1951 (pages 305–507 relied on).